United States Patent
Lyness

(10) Patent No.: US 7,739,431 B2
(45) Date of Patent: Jun. 15, 2010

(54) KEYSTROKE MONITORING APPARATUS AND METHOD

(75) Inventor: Adam R. Lyness, Christchurch (NZ)

(73) Assignee: Keyghost Limited, Christchurch (NZ)

( * ) Notice: Subject to any disclaimer, the term of this patent is extended or adjusted under 35 U.S.C. 154(b) by 747 days.

(21) Appl. No.: 11/630,640

(22) PCT Filed: Jul. 8, 2005

(86) PCT No.: PCT/NZ2005/000166

§ 371 (c)(1),
(2), (4) Date: Dec. 26, 2006

(87) PCT Pub. No.: WO2006/006877

PCT Pub. Date: Jan. 19, 2006

(65) Prior Publication Data

US 2009/0172320 A1    Jul. 2, 2009

(30) Foreign Application Priority Data

Jul. 14, 2004    (NZ) .................................. 534096

(51) Int. Cl.
*G06F 13/12* (2006.01)
*G06F 13/00* (2006.01)

(52) U.S. Cl. ................. 710/67; 710/15; 360/4

(58) Field of Classification Search .......... 710/15–19, 710/62–67; 360/4; 345/168
See application file for complete search history.

(56) References Cited

U.S. PATENT DOCUMENTS

| | | | | |
|---|---|---|---|---|
| 4,964,075 A | * | 10/1990 | Shaver et al. ................. | 710/67 |
| 5,272,571 A | * | 12/1993 | Henderson et al. ............. | 360/4 |
| 6,118,447 A | * | 9/2000 | Harel .......................... | 717/131 |
| 6,401,209 B1 | * | 6/2002 | Klein .......................... | 726/34 |
| 2002/0052860 A1 | * | 5/2002 | Geshwind ..................... | 706/62 |
| 2002/0190959 A1 | * | 12/2002 | Nagao ........................ | 345/173 |
| 2005/0193417 A1 | * | 9/2005 | Bankers et al. ................ | 725/60 |
| 2008/0118082 A1 | * | 5/2008 | Seltzer et al. .............. | 381/94.1 |
| 2009/0013252 A1 | * | 1/2009 | DeWitt ....................... | 715/716 |
| 2009/0172320 A1 | * | 7/2009 | Lyness ....................... | 711/161 |

FOREIGN PATENT DOCUMENTS

WO    2004/097614 A1    11/2004

OTHER PUBLICATIONS

International Search Report for PCT/NZ2005/000166 mailed Oct. 4, 2005.
*InstaGuard* website, as archived Mar.-Aug. 2003.

* cited by examiner

*Primary Examiner*—Christopher B Shin
(74) *Attorney, Agent, or Firm*—Nixon & Vanderhye P.C.

(57) ABSTRACT

Keystrokes input by a user are stored in non-volatile memory together with time stamps, creating a record of keystrokes and associated time stamps. At least some of the time stamps are generated and recorded in response to receipt of specific keystroke events, such as a specific keystroke, a specific sequence of keystrokes, a keystroke following an interval of inactivity or an interval of inactivity following a keystroke. The resulting keystroke record may show sessions of keystrokes received, with a start and end time stamp for each session. An alteration record is also provided to track alterations and erasures of the keystroke record.

27 Claims, 1 Drawing Sheet

KEYSTROKE MONITORING APPARATUS AND METHOD

This application is the US national phase of international application PCT/NZ2005/000166 filed 8 Jul. 2005, which designated the U.S. and claimed priority of NZ 534096 filed 14 Jul. 2004, the entire contents of each of which are hereby incorporated by reference.

FIELD OF THE INVENTION

The invention relates to monitoring of keystrokes. In particular the invention relates to the monitoring of keystrokes and storage of the keystrokes with associated time stamps.

BACKGROUND OF THE INVENTION

Keystrokes entered by a user at a keyboard or other user input device may be monitored by software on the host computer. Alternatively, a device may be connected between the keyboard and the host computer, as described in the co-pending application published as WO 04/097614. Commercially available hardware keystroke monitoring devices and software record keystrokes into a log that can be retrieved later by users.

Newer models include time stamping features that record the time and date at regular intervals after the device is activated. This is generally a useful feature. However, when there are significant intervals between keystrokes it may be difficult to determine exactly when the keys of interest were typed. It is currently not easy to differentiate sessions of typing when they are interspersed with large time intervals. Also, the time stamp is simply entered at periodic intervals and is therefore placed arbitrarily in the keystroke log. A time stamp may be placed between letters and be difficult to find.

Where time stamping capability is added to a hardware device, a larger battery is required to power the internal clock. This means that the device is larger and more conspicuous, unless the keystroke monitor is embedded into the keyboard. However, some devices plug directly into the keyboard port of the computer and the larger size is undesirable for such devices.

In prior software methods and hardware devices it is also possible to tamper with the recorded log and/or internal clock of the device. This means that the evidence recorded by the monitor is unreliable for law enforcement purposes.

There is a need for an apparatus and method that alleviates these problems in the prior art.

It is an object of the invention to allow keystrokes and time stamps to be recorded in such a manner that the resulting log can be more easily interpreted by users.

It is a further object of the invention to provide a hardware device in which keystrokes and time stamps are recorded in such a manner that the resulting log can be more easily interpreted by users.

It is a further object of the invention to improve reliability of the keystroke log.

It is a further object of the invention to provide a hardware keystroke monitoring device with time stamping capability which is less conspicuous than prior devices.

Each object is to be read disjunctively with the object of at least providing the public with a useful choice.

SUMMARY OF THE INVENTION

In a first aspect the invention provides a method of recording keystrokes, including: receiving a plurality of keystrokes, storing the received keystrokes in non-volatile memory, generating a plurality of time stamps and storing the time stamps in the non-volatile memory to create a record of keystrokes and associated time stamps;

wherein at least some of the time stamps are generated in response to receipt of specific keystroke events.

In a second aspect the invention provides an apparatus for recording keystrokes, including: non-volatile memory; a processor configured to store keystrokes received from a user input device in the non-volatile memory, to generate time stamps in response to receipt of specific keystroke events and to store the generated time stamps in the non-volatile memory, to create a record of keystrokes and associated time stamps.

The specific keystroke event may be a keystroke received following an interval of inactivity, an interval of inactivity following a received keystroke, a keystroke from a predetermined subset of the set of all keystrokes, or a predetermined sequence of keystrokes. Other keystroke events may also be used, but the term does not include simple receipt of any keystroke. That is, the invention is not concerned with recording keystrokes with a time stamp for every keystroke.

BRIEF DESCRIPTION OF THE DRAWINGS

The invention will now be described by way of example only with reference to the accompanying drawings, in which.

DESCRIPTION OF THE INVENTION

Figure 1:
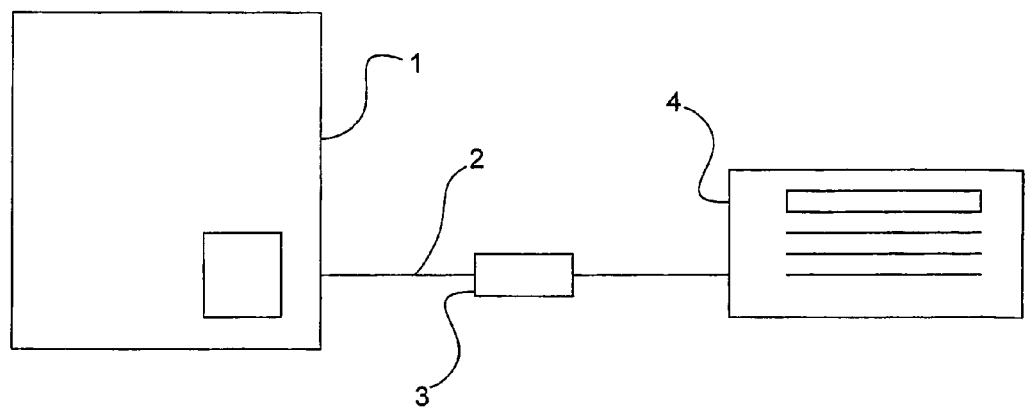
FIG. 1 shows an apparatus connected inline between a host computer and a user input device.

FIG. 1 shows a host computer 1 connected by cable 2 to a user input device 4, with a hardware keystroke monitoring apparatus 3 connected inline. The host computer may be a computer, personal digital assistant, cellular telephone or other suitable equipment. Similarly, the user input device may be a keyboard or other suitable user input device.

The apparatus records all keystrokes typed onto the keyboard and these can later be accessed by a user typing in a password in a suitable program such as Microsoft Notepad. A menu may be presented to the user allowing various features, including display of the recorded keystrokes, resetting of the clock, erasing of the keystroke log and setting of time intervals for the time stamp.

Figure 2:
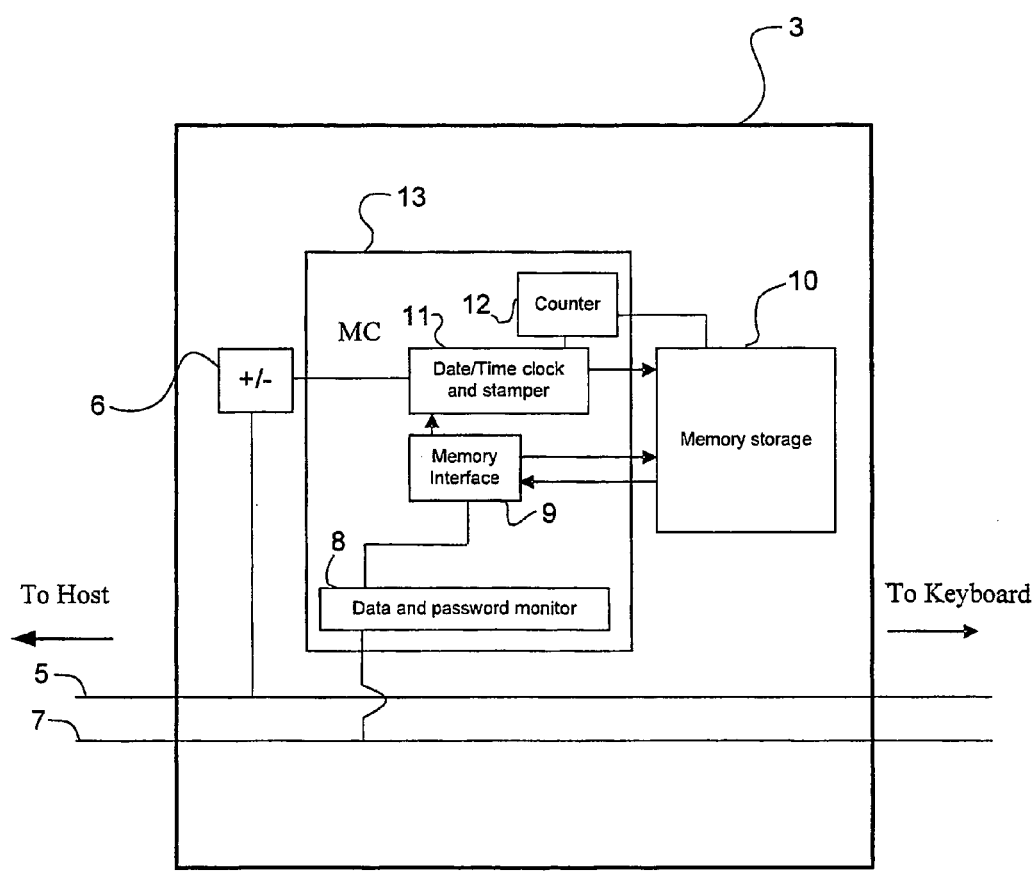
FIG. 2 is a schematic diagram of a keystroke monitoring apparatus.

FIG. 2 shows the apparatus 3. In this embodiment the apparatus includes non-volatile memory 10, a microcontroller 13 and a battery 6. The apparatus intercepts keystrokes sent from the keyboard to the host over line 7, using the data and password monitor 8. A memory interface 9 writes received keystrokes to non-volatile memory 10. Preferably the memory 10 is Flash memory. The time/date clock and stamper 11 is powered by the battery 6 and sends information to the memory 10 as required.

The apparatus records keystrokes and time stamps in sessions of typing. A session begins when a keystroke is received following an interval of inactivity. The length of this interval may be pre-set by a user. When keystroke information is received from the data line 7 by the data and password monitor 8, the time/date clock and stamper 11 generates and sends a time stamp to memory 10 indicating that the session has begun. The stamp may read: 'session begins at (time/date)'.

When there is no longer any keystroke information received by the monitor 8 for a time interval a further time stamp is sent from the time/date clock 11 to the memory 10 indicating that the session has ended ('session ends at (time/date)'). The length of this interval may also be set by the user. Thus, sessions of typing are recorded, preceded and followed by time stamps indicating their start and end times.

The recorded sessions can be distinguished according to the time and/or date by viewing software in the host and easily found by the search function in the apparatus' firmware, as will be understood by readers skilled in the art. Sessions and/or time stamps may be colour-coded for even greater ease of interpretation.

The apparatus may also record time stamps in response to receipt of other specific keystroke events. For example, the apparatus could record a time stamp whenever a space or enter keystroke is received. The apparatus could also record a time stamp whenever a predetermined sequence of keystrokes is received (e.g. a specific word or name). These options may be selected or deselected by a user.

Preferably, when the apparatus detects commencement of a power supply from the host computer to the keyboard, it records a further time stamp in the memory 10. The apparatus may also record time stamps at regular intervals pre-set by the user.

If a user changes the time of the time/date clock and stamper 11 or alters or erases the memory 10, the clock/erase counter 12 stores a record of the alteration or erasure in non-volatile memory. In the embodiment shown, this record is stored in the same non-volatile memory as the keystroke record, although a separate memory could be provided. This information is expected to be useful for legal purposes and discourages tampering of the stored record by a user or person with access to the apparatus password.

In general, the clock/erase counter 12 stores a timestamp and/or a record of any "administrator" functions performed (i.e. functions that require a password to be entered before execution). Functions are stored in this record as hexadecimal numbers which identify each function uniquely, together with a timestamp indicating the time when each function was executed. The apparatus firmware forbids alteration of this data by any user, including "administrators".

In the preferred embodiment the battery 6 is a rechargeable lithium battery that is small so it can fit into an inconspicuous and removable apparatus connected inline as indicated in FIG. 1. The apparatus utilises power sent by the host to the keyboard over power line 5, to recharge the battery.

While the invention has been described with reference to a hardware apparatus for connection inline between a host computer and a keyboard, the invention also applies to apparatuses embedded in keyboards and computers, and to software for recording keystrokes.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of recording keystrokes, including:
receiving a plurality of keystrokes, storing the received keystrokes in non-volatile memory, generating a plurality of time stamps and storing the time stamps in the non-volatile memory to create a record of keystrokes and associated time stamps;
wherein at least some of the time stamps are generated in response to receipt of specific keystroke events.

2. A method as claimed in claim 1, wherein at least some of the specific keystroke events are keystrokes following intervals of inactivity longer than a predetermined threshold.

3. A method as claimed in claim 2, wherein the predetermined threshold is less than 3600 seconds.

4. A method as claimed in claim 3, wherein the predetermined threshold is about 10 seconds.

5. A method as claimed in claim 2, wherein keystrokes and time stamps are stored such that the keystrokes following intervals of inactivity longer than a predetermined threshold are preceded by their associated time stamps.

6. A method as claimed in claim 5, further including generating time stamps in response to an interval of inactivity following keystrokes and recording these in the non-volatile memory, such that the record includes sessions of keystrokes defined by intervals of inactivity, each session having time stamps indicating its start and end times.

7. A method as claimed in claim 1, wherein at least some of the specific keystroke events are keystrokes from a predetermined subset of the set of all keystrokes.

8. A method as claimed in claim 7, wherein the predetermined subset consists of the space and enter keystrokes.

9. A method as claimed in claim 1, wherein at least some of the specific keystroke events are predetermined sequences of keystrokes.

10. A method as claimed in claim 1, further including storing an alteration record in non-volatile memory, for tracking alterations to a clock used in generating time stamps and/or alterations and erasures of the stored keystrokes and time stamps.

11. A method as claimed in claim 10, wherein the alteration record includes entries indicating types of alterations or erasures made, and a time stamp associated with each entry.

12. A method as claimed in claim 10, further including preventing all users from altering or deleting the alteration record.

13. A method as claimed in claim 1, when performed by an apparatus connected inline between a host computer and a user input device sending the keystrokes.

14. A method as claimed in claim 13, further including generating and storing a time stamp in response to detection of commencement of a power supply from the host computer to the user input device sending the keystrokes.

15. An apparatus for recording keystrokes, including:
non-volatile memory;
a processor configured to store keystrokes received from a user input device in the non-volatile memory, to generate time stamps in response to receipt of specific keystroke events and to store the generated time stamps in the non-volatile memory, to create a record of keystrokes and associated time stamps.

16. An apparatus as claimed in claim 15, wherein at least some of the specific keystroke events are keystrokes following intervals of inactivity longer than a predetermined threshold.

17. An apparatus as claimed in claim 16, the processor being configured to store keystrokes and time stamps such that the keystrokes following intervals of inactivity longer than a predetermined threshold are preceded by their associated time stamps.

18. An apparatus as claimed in claim 17, the processor being further configured to generate time stamps in response to an interval of inactivity following keystrokes and to record these in the non-volatile memory, such that the record includes sessions of keystrokes defined by intervals of inactivity, each session having time stamps indicating its start and end times.

19. An apparatus as claimed in claim 15, wherein at least some of the specific keystroke events are keystrokes from a predetermined subset of the set of all keystrokes.

20. An apparatus as claimed in claim 19, wherein the predetermined subset consists of the space and enter keystrokes.

21. An apparatus as claimed in claim 15, wherein at least some of the specific keystroke events are predetermined sequences of keystrokes.

22. An apparatus as claimed in claim 15, the processor being configured to maintain an alteration record in non-volatile memory, for tracking alterations to a clock used in generating time stamps, and/or alterations and erasures of the stored keystrokes and time stamps.

23. An apparatus as claimed in claim 22, the processor being configured to store entries indicating types of alterations or erasures made and a time stamp associated with each entry in the alteration record.

24. An apparatus as claimed in claim 22, adapted to prevent all users from altering or deleting the alteration record.

25. An apparatus as claimed in claim 15, adapted to be connected inline between a user input device and a host computer.

26. An apparatus as claimed in claim 25, wherein the time stamper is further configured to generate and store a time stamp in the non-volatile memory in response to detection of commencement of a power supply from the host computer to the user input device.

27. An apparatus as claimed in claim 25, further including a rechargeable battery configured and connected so as to recharge from power sent from the host computer to the user input device.

\* \* \* \* \*